US008427318B2

(12) United States Patent
Hamilton, II et al.

(10) Patent No.: US 8,427,318 B2
(45) Date of Patent: Apr. 23, 2013

(54) METHOD AND SYSTEM FOR CARBON VALUE TRACKING AND LABELING

(75) Inventors: Rick A. Hamilton, II, Charlottesville, VA (US); Paul A. Moskowitz, Yorktown Heights, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 12/276,845

(22) Filed: Nov. 24, 2008

(65) Prior Publication Data

US 2010/0127868 A1 May 27, 2010

(51) Int. Cl.
*G08B 13/14* (2006.01)

(52) U.S. Cl.
USPC ......................... 340/572.1; 705/414; 235/385

(58) Field of Classification Search ............. 340/539.26, 340/539.22, 572.1–572.9; 235/375–385; 705/400, 414, 412, 500
See application file for complete search history.

(56) References Cited

U.S. PATENT DOCUMENTS 6,266,649 B1 7/2001 Linden et al.
6,294,997 B1 9/2001 Paratore et al.
7,137,000 B2 11/2006 Hohberger et al.
7,206,753 B2 4/2007 Bancroft et al.
7,400,253 B2 * 7/2008 Cohen ........................ 340/572.1
2003/0113091 A1 6/2003 Chou et al.
2003/0144914 A1 7/2003 Gossard et al.
2006/0085152 A1 4/2006 Sugiyama et al.
2006/0089851 A1 4/2006 Silby et al.
2007/0210923 A1 * 9/2007 Butler et al. ............... 340/572.8
2007/0239552 A1 10/2007 Sundaresan
2007/0255457 A1 11/2007 Whitcomb et al.
2007/0285229 A1 * 12/2007 Batra et al. ............... 340/539.26
2008/0071646 A1 3/2008 Hodson et al.
2008/0189142 A1 * 8/2008 Brown et al. ..................... 705/4
2009/0288606 A1 * 11/2009 Zimmerman ............. 119/51.02
2010/0052215 A1 * 3/2010 Emond et al. ................. 264/275
2010/0249955 A1 * 9/2010 Sitton ............................ 700/33

FOREIGN PATENT DOCUMENTS

GB 002925 8/2006
WO 2005/086049 A1 9/2005
WO 2005/122020 A1 12/2005

OTHER PUBLICATIONS

Complete File History for U.S. Appl. No. 12/276,757.

* cited by examiner

*Primary Examiner* — George Bugg
*Assistant Examiner* — Edny Labbees
(74) *Attorney, Agent, or Firm* — John R. Pivnichny; Hoffman Warnick LLC

(57) ABSTRACT

A solution for tracking the carbon footprint value of an object as the object is manufactured and/or transported. This value may be stored in a tag associated with the object. Thus, the object can track its own carbon footprint, e.g., using the tag. Alternatively, the values are stored in a database with an entry associated with a particular object. The final composite value, e.g., the sum of the intermediate values associated with manufacturing steps, components, transportation steps, and disposal, may be used, e.g., seen, by the consumer or retail store. The store may use such values to arrange objects by footprint value on a shelf or in a store, or for other purposes. Therefore, the disclosure enables manufactures of products to track the carbon footprint for their products as the products are being produced and transported.

20 Claims, 2 Drawing Sheets

Storage Component 125
Carbon Tracking Program 180
185
Carbon Data 190
Processing Component 115
120
I/O Component 135
110 Local Computing System
100

170 Network
Remote Computing System 145
Device Reader 150
Wireless Communication 175
Item Being Manufactured 107
Wireless Tag Device - RFID 109
Manufacturing Line 105

Remote
Local
Obtain Data
Query, Respond with Data
Query, Respond with Data
202
202
201
Database
EPCIS
EPCIS
EPCIS
EPCIS
Capture Mfg Data
Capture Shipping Data
Capture Shipping Data
Capture Storage Data
107
107
107
EPC
Barcode
Ship Product
Ship Product to Retail
203
204
205
Mfg Plant
Distribution Center
Retail
200

METHOD AND SYSTEM FOR CARBON VALUE TRACKING AND LABELING

CROSS REFERENCE TO CO-PENDING APPLICATIONS

This application is related in some aspects to commonly owned and co-pending patent application Ser. No. 12/276,757 entitled "SYSTEM AND METHOD FOR SEGMENTING ITEMS IN A SHOPPING CART BY CARBON FOOTPRINT", filed on Nov. 24, 2008, the entire contents of which are herein incorporated by reference.

TECHNICAL FIELD

This disclosure relates generally to carbon footprint tracking, and more particularly to an automated solution for recording and tracking carbon footprints associated with transported objects progressing through a supply chain.

BACKGROUND ART

A carbon footprint is a measure of the impact human activities have on the environment in terms of the amount of greenhouse gases produced, e.g., measured in units of carbon dioxide. The carbon footprint is useful for individuals and organizations to conceptualize their personal or organizational impact in contributing to global climate change. Consumers and manufacturers are increasingly interested in determining their impact on the environment, including their carbon footprints. In fact, several notable companies have committed to becoming carbon neutral.

SUMMARY OF THE INVENTION

The present disclosure is directed to a solution for tracking the carbon value for a consumable or manufactured object. Furthermore, this disclosure provides a convenient way to communicate the carbon value to a consumer, store, and/or the like. Also disclosed is the calculation of a transportation carbon footprint. This disclosure also provides that various carbon footprint updates may be provided at other points in the product supply chain, for example, during stages in the manufacturing process, in an assembly line, and/or the like.

A first aspect of the invention provides a method comprising: associating a tag with an object, wherein the tag is configured to store data and communicate the data using a wireless communications link; and writing a carbon footprint value to the tag, wherein the carbon footprint value is related to a weight of at least one greenhouse gas added to the atmosphere as a result of at least a portion of at least one of: manufacture, transport, storage, or disposal of the object.

A second aspect of the invention provides a system comprising: a tag configured to be associated with an object, wherein the tag includes: a component configured to store data; a wireless communications device configured to communicate data using a wireless communications link; and a component configured to write a carbon footprint value to the component configured to store data according to data received by the wireless communications device, wherein the carbon footprint value is related to a weight of at least one greenhouse gas added to the atmosphere as a result of at least a portion of at least one of: manufacture, transport, storage, or disposal of the object.

A third aspect of the invention provides a computer readable article of manufacture tangibly embodying computer readable instructions for executing a computer implemented method comprising: associating a tag with an object, wherein the tag is configured to store data and communicate the data using a wireless communications link; and writing a carbon footprint value to the tag, wherein the carbon footprint value is related to a weight of at least one greenhouse gas added to the atmosphere as a result of at least a portion of at least one of: manufacture, transport, storage, or disposal of the object.

A fourth aspect of the invention provides a method of generating a system, the method comprising: associating a tag with an object, wherein the tag is configured to store data and communicate the data using a wireless communications link, and write a carbon footprint value to the tag, wherein the carbon footprint value is related to a weight of at least one greenhouse gas added to the atmosphere as a result of at least a portion of at least one of: manufacture, transport, storage, or disposal of the object; and providing at least one device configured to transmit a signal associated with the carbon footprint value for processing by the tag using the wireless communications link.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
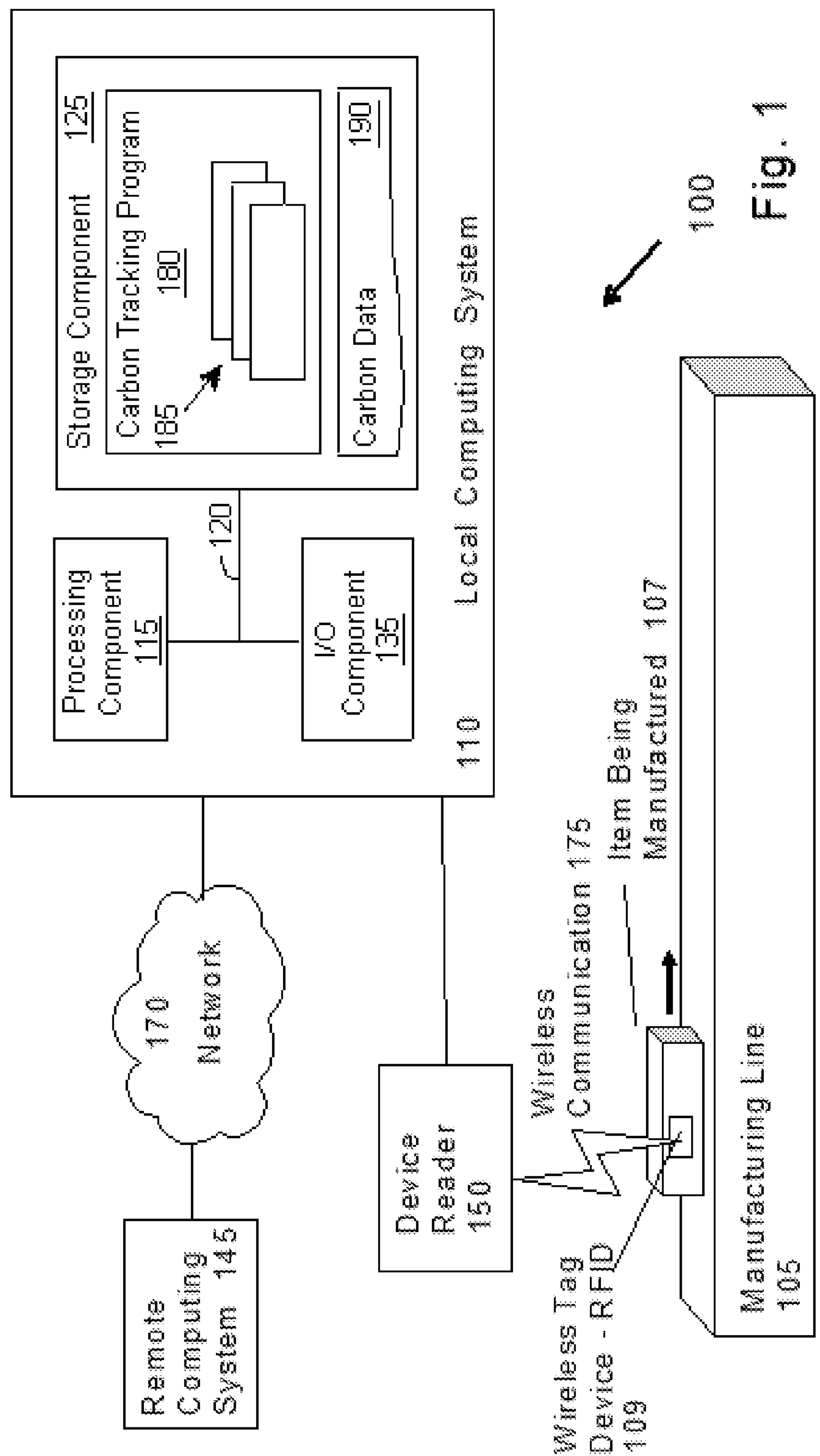
FIG. 1 shows an illustrative system for tracking a carbon footprint value for an object as the object is manufactured according to an embodiment.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Tracking an object's carbon footprint is difficult because, in part, contributions to the object's carbon footprint are segmented, that is, they come in many stages such as: manufacture, transport, storage, and disposal, and therefore an overall carbon footprint value is difficult to calculate.

Disclosed is a solution for tracking the carbon footprint value of an object as the object is manufactured and transported. The carbon footprint value is related to the weight of carbon dioxide and/or other greenhouse gases added to the atmosphere during a product life cycle. This value may be stored in a tag, e.g., an RFID tag (radio frequency identification tag), described in more detail herein, or other standard or electronic labels associated with the object.

Furthermore, this disclosure provides a convenient way to communicate the carbon footprint value of the object to a consumer, retail store, and/or the like. Also disclosed is the calculation of a transportation carbon footprint. This disclosure also provides that various carbon footprint updates may be provided at other points in the product supply chain, for example, during stages in the manufacturing process, in an assembly line, and/or the like. Thus, this disclosure provides several advantages, including: (1) the object, e.g., a retail product, can track its own carbon footprint value, e.g., using an RFID tag. Further, the carbon footprint value can be stored in a database with an entry associated with the particular object; and (2) the object can automatically increment the carbon footprint value from a signal sent by a transportation device. For example, a vehicle bus, such as the SAE J1850 bus, may be used to send or transfer information to an RFID tag or label, optionally through an intermediate carbon footprint interface module (CFIM), described herein.

The final composite carbon footprint value, e.g., a sum of intermediate carbon footprint values associated with manufacturing steps, components, transportation steps, and/or disposal, may be used, e.g., viewed, by the consumer, retail store, or the like. The store may use such values to arrange products by carbon footprint value on a shelf or in a retail store, or for other purposes. For example, a retail establishment may only carry products with carbon footprint values below a certain threshold. A service may facilitate the carbon footprint tracking process and/or carbon footprint database management.

Tracking Through the Manufacturing Process:

Turning to the figures, FIG. 1 shows an illustrative system 100 for tracking a carbon footprint value for an object (item) 107 as the object is manufactured according to an embodiment. In particular, a tag 109, e.g., a wireless tag device, such as an RFID, can be attached to object 107 as it moves along a manufacturing line 105. Tag 109 may store a manufacturing carbon footprint value and may hold the carbon footprint value(s) from any or all steps in the product lifecycle e.g., manufacturing, shipping (transportation), storage, and disposal. Further, tag 109 can store one or more incremental carbon footprint values for the entire supply chain or one or more portions thereof. An example of a tag 109 that can be utilized is an RFID tag that conforms to the EPCglobal UHF Gen2 standard, which is equivalent to the ISO 18000-6C standard. EPC is an acronym for electronic product code. Each EPC may include a unique serial number. Such a tag 109 may comprise read/writeable memory to enable the storage and/or retrieval of carbon footprint value(s).

As discussed herein, an example of a tag 109 that can be utilized in implementing an embodiment of this disclosure is an RFID tag. A typical RFID system can utilize a device reader 150 to receive data from a tag 109 affixed to an object 107, which can be provided for processing by a local computing system 110. By reading the data, the RFID system can be used by an entity to identify each object 107 with a tag 109. Each tag 109 may have a unique serial number. Device reader 150 may be used to read and/or write data to tag 109. The RFID system generally includes an antenna, a device reader 150, a computing device, such as local computing system 110, an operator terminal, and a database. The antenna transmits a radio signal from device reader 150 that is received by tag 109 affixed to object 107. The tag 109, in turn, responds to the radio signal by sending a responding radio signal that includes data stored within tag 109. Device reader 150 receives the responding radio signals via the antenna. From the responding radio signal, device reader 150 can extract the data sent by tag 109. The data is generally sent to a local computing system 110 from which the data can be accessed by the operator terminal, stored in the database as carbon data 190, or the like.

In an embodiment, tag 109 can be passive, e.g., not have any batteries or transmitters. A passive tag 109 receives energy to operate from the field of device reader 150. Device reader 150 may have writing as well as reading capabilities. Thus, device reader 150 may write information, such as a representation of a carbon footprint value to a tag 109. Such a device reader 150 is manufactured by the Intermec Corporation, Alien Technology, and FEIG Electronic. A passive tag 109 can respond to signals by modulating the signal reflected from the tag 109. An illustrative passive tag 109 is the tag contained within an access control badge such as those manufactured by the HID Corporation. Similarly, tag 109 can comprise a battery-assisted tag, sometimes referred to as semi-passive or semi-active, which has a battery to provide energy for the operation of tag 109. In this case, tag 109 also can operate by modulating a reflected signal. An example is the E-ZPass® tag (toll collection tags) used for electronic toll collection in New York and other states. Further, tag 109 can comprise an active tag, which includes a power source, such as one or more batteries, and a transmitter capable of initiating its own transmissions. An example is the WhereNet tag used for object location.

Still further, tag 109 can be implemented using another technology, termed a mote. A mote is similar to an active RFID tag, having receiving and transmitting ability. Additionally, a mote has on-board sensing, processing, and storage, with an ability to form an ad hoc network, and to report data to a wireless gateway. Tag 109 can be implemented using any type of tag, including any version of RFID tag, a mote, a bar code (as discussed herein), or the like, and can be employed to receive and store information to enable an embodiment of the invention described herein. It is also noted that while RFID tags are discussed herein as an example of the sort of tag that can be used with the disclosed invention, any other now known or later developed, technology for storing information relating to an object may be used.

As shown in FIG. 1, a remote computing system 145 can connect to local computing system 110 via a network 170. Local computing system 110 can contain, among other things, a processing component 115 (e.g., one or more processors), a storage component 125 (e.g., a storage hierarchy), an input/output (I/O) component 135 (e.g., one or more I/O interfaces and/or devices), and a communications pathway 120. In general, processing component 115 executes program code, such as carbon tracking program 180, which is at least partially embodied in storage component 125. While executing program code, processing component 115 can process data, such as carbon data 190, which can result in reading and/or writing the data from/to storage component 125 and/or I/O component 135 for further processing. Pathway 120 provides a communications link between each of the components in local computing system 110. I/O component 135 can comprise one or more human I/O devices, which enable a human user to interact with local computing system 110 and/or one or more communications devices to enable remote computing system 145 to communicate with local computing system 110 using any type of communications link, such as network 170. To this extent, carbon tracking program 180 can manage a set of interfaces (e.g., graphical user interface(s), application program interface, and/or the like) that enable humans and/or other systems, such as remote computing system 145, to interact with carbon tracking program 180. Further, carbon tracking program 180 can manage (e.g., store, retrieve, create, manipulate, organize, present, etc.) the data, such as carbon data 190, using any solution.

In any event, local computing system 110 can comprise one or more general purpose computing articles of manufacture (e.g., computing devices) capable of executing the program code of carbon tracking program 180 installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, carbon tracking program 180 can be embodied as any combination of system software and/or application software.

Further, carbon tracking program 180 can be implemented using a set of modules 185. In this case, a module 185 can enable local computing system 110 to perform a set of tasks used by carbon tracking program 180, and can be separately developed and/or implemented apart from other portions of carbon tracking program 180. As used herein, the term "component" means any configuration of hardware, with or without software, which implements and/or enables local computing system 110 to implement the functionality described in conjunction therewith using any solution, while the term "module" means program code that enables local computing system 110 to implement the functionality described in conjunction therewith using any solution. When embodied in a tangible medium of expression, a module 185 is a component. Regardless, it is understood that two or more components, modules, and/or systems may share some/all of their respective hardware and/or software. Further, it is understood that some of the functionality discussed herein may not be implemented or additional functionality may be included as part of local computing system 110.

When local computing system 110 comprises multiple computing devices, each computing device can have only a portion of carbon tracking program 180 embodied thereon (e.g., one or more modules 185). However, it is understood that local computing system 110 and carbon tracking program 180 are only representative of various possible equivalent specific purpose computer systems that may perform a process described herein. To this extent, in other embodiments, the functionality provided by local computing system 110 and carbon tracking program 180 can be at least partially implemented by one or more computing devices that include any combination of general and/or specific purpose hardware with or without program code. In each embodiment, the hardware and program code, if included, can be created using standard engineering and programming techniques, respectively.

Regardless, when local computing system 110 includes multiple computing devices, the computing devices can communicate over any type of communications link. Further, while performing a process described herein, local computing system 110 can communicate with one or more other computer systems, such as remote computing device 145, using any type of communications link. In either case, the communications link can comprise any combination of various types of wired and/or wireless links; comprise any combination of one or more types of networks 170; and/or utilize any combination of various types of transmission techniques and protocols.

The local computing system 110 can be communicatively connected to a device reader 150 using a wired or wireless communications link. Device reader 150 can read and/or write data from/to the wireless tag device 109, e.g., a RFID tag, on the object 107 being manufactured on manufacturing line 105. The device reader 150 reads from and/or writes to the wireless tag device 10 via a wireless communications link 175. The wireless communication link 175 can be any now known, or later developed, technology that transfers information over a distance without the use of electrical conductors or wires.

Throughout the manufacturing process for object 107, data stored in the tag's 109 memory may be updated. To this extent, device reader 150 can comprise a transmitter node associated with a particular manufacturing stage, which performs the updating. The transmitter node 150 can generate a signal that encodes an estimated carbon footprint resulting from the particular manufacturing stage, e.g., including the actual electricity consumed plus an estimated carbon cost of operation. Additionally, device reader 150 can comprise a reader node, located at another point in the manufacturing process, which reads the current carbon footprint value stored on tag 109. In this case, local computing system 110 can invoke processing if the value exceeds a threshold, e.g., issue an alert. Such a reader node may be advantageous for a manufacturing process that has varying levels of electrical or chemical needs based on the nature of the process. For example, if an object 107 is traversing through an assembly that requires more energy to assemble than is typical, it may indicate future steps will likewise require more energy, at which point it would be advantageous to destroy the object 107 rather than expend additional resources to complete the manufacturing process.

Tracking Through the Transportation Process: Transportation "Bus"

Still further, device reader 150 and/or local computing system 110 can be implemented on a transportation device (e.g., a vehicle) that is being used to transport object 107 after it has been at least partially manufactured. To this extent, information such as a "truck type" and miles driven may also increment the carbon footprint value stored on tag 109. The object 107 may automatically increment its carbon footprint value from a signal sent by the transportation device, e.g., a local computing system 110 in a plane or a car engine/odometer may send a signal to the tag 109 via device reader 150. For example, most motor vehicles have an internal communications bus from which all operating parameters of the vehicle may be derived including mileage data and fuel tank level. The internal bus may be a CAN, Car Area Network, or the Society of Automotive Engineers SAE J1850 bus. Device reader 150 can comprise an RFID reader/writer with an interface to the vehicle bus, which automatically updates the carbon footprint value(s) stored in an RFID tag 109 attached to an object 107 being transported by the vehicle.

Note that the updating of the carbon footprint value may be done periodically, e.g., every ten miles, or at certain points, e.g., when the object 107 is unloaded from the transporting vehicle. Encryption may be used to help prevent tampering with carbon footprint values stored in the tag 109.

Carbon-Footprint Interface Module (CFIM)

In some embodiments, device reader 150 can comprise a carbon-footprint interface module (CFIM) that accesses, converts, and manages inputs for carbon-footprint calculations, e.g., inputs from a car J1850 bus, and transmits the values to the tag 109. If a CFIM is designed with a standard interface, it may be used by a multitude of transportation devices, e.g., plane, train, car, truck, ship, and/or the like. For example, the truck odometer reading, truck type, number of similar objects 107 being transported, transportation company ID, and fuel type may be sent from the vehicle's internal bus to the CFIM. The CFIM can convert the transportation information to a carbon footprint value to be stored on the tag 109. For example, the CFIM may take the form of a RFID reader, which receives input data as to the distance (e.g., miles) traveled or fuel used from the car or vehicle bus. The CFIM processor converts the fuel used to a carbon footprint value and uses its wireless reader/writer capability to write the carbon footprint value to a tag 109 associated with an object 107 carried by the vehicle. Note that various methods exist for calculating or estimating carbon footprint values based upon an individual's use of a car, electricity, or home heating, e.g. carbon footprint calculators. Writing this information directly to the tag 109, and not to a remote server, is advantageous because there may be times during transport that the object 107 will not necessarily have network connectivity to an external service. Thus, it may be more convenient for the tag 109 to be incremented locally, either periodically or during events of the transportation cycle.

Additional information may also be used in calculating the carbon footprint value for an object 107. For example, if the object 107 is one of one hundred similar objects being transported, this may reduce the carbon footprint for each object 107 by a factor of one hundred, e.g., below the carbon footprint value of the object 107 in the case where the object 107 is being shipped individually. Similarly, a relative weight of the object 107 for the total shipment weight can be used to calculate the carbon footprint for the object 107, e.g., by allocating a relative contribution of the object 107 according to its contribution to the overall weight of the shipment. In some instances, companies may use carbon-offset methods, and this information may be used by the CFIM when determining carbon footprint values to write to the tag 109.

Figure 2:
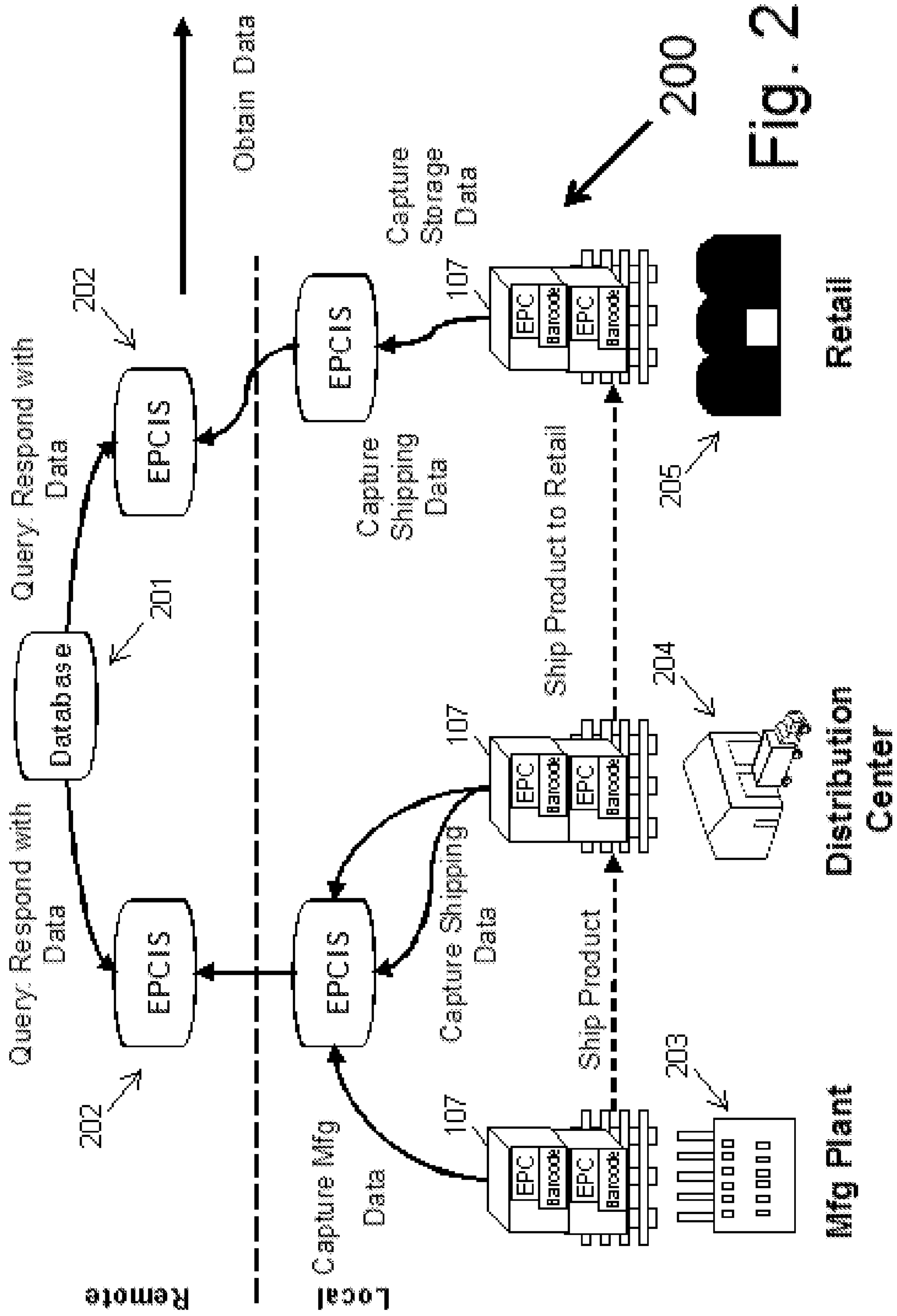
FIG. 2 shows another illustrative system for tracking a carbon footprint value for an object according to another embodiment.

FIG. 2 shows another illustrative system 200 for tracking a carbon footprint value for an object according to another embodiment, in which the carbon footprint value(s) are stored in a database 201. Database 201 can be stored on local computing system 110 (FIG. 1) and managed by carbon tracking program 180 (FIG. 1) using any solution. The carbon footprint value(s) for an object 107 can be stored in database 201 in addition to or instead of storing the carbon footprint value (s) in the tag 109 (FIG. 1). In system 200, using an information service 202, such as the EPCglobal EPCIS (Electronic Product Code Information Service), carbon footprint value(s) for an object 107 can be stored and retrieved at any point or stage in the supply chain. For example, FIG. 2 shows the manufacturing stage 203, shipping stage 204, and storage stage 205. Other stages and/or incremental steps of a stage, may also have carbon footprint values associated with them, which also can be stored in database 201. An illustrative implementation of EPCIS 202 is called RFIDIC (RFID Information Center), which is offered as a product by the IBM Corporation.

Use in the Retail Environment:

In one embodiment, the total carbon footprint value of an object 107 is incremented during various steps of the manufacture 203 and transportation 204 stages. The carbon footprint value may be stored on a tag, e.g., tag 109 (FIG. 1), on the object 107 and/or in database 201. In another embodiment, the various carbon footprint values that contribute to the total carbon footprint value of the object 107, e.g., manufacturing carbon footprint value, transportation carbon footprint value, storage carbon footprint value, display carbon footprint value, etc., are all stored on the tag 109 and/or in database 201.

In any event, a retail store may use an automated system, which can be implemented by local computing system 110 (FIG. 1), to read the carbon footprint values for a group of objects 107, and arrange products on the shelves according to the order of the respective carbon footprint values. Further, the retail store can display the corresponding carbon footprint value for each product. Consumers may find value in seeing products sorted by carbon footprint values and comparing the carbon footprint values for products they purchase.

In another embodiment, the carbon footprint values are not stored on tags 109, instead the object's 107 carbon footprint value is stored in a database 201 (e.g., as carbon data 190 on local computing system 110 of FIG. 1) and is managed by a service. In this embodiment, local computing system 110 can generate a web page, which can be used to search for and display carbon footprint values for various objects 107. Consumers may be interested in seeing similar objects 107 displayed on the web page, sorted by the respective carbon footprint values. At the retail store, the total carbon footprint value may be read directly from the tag 109 using an automated system, e.g., device reader 150, or in the alternative embodiment, it may be retrieved from database 201.

Additionally, the carbon footprint value may be written to a printed label in human-readable print or written to a bar code label. Such labels may be affixed to the object 107 or to the shelves in the retail store. Bar code labels and printed labels may be read by a wireless device, for example, by an optical device that may be a manually operated or semi-automated or automated instrument. In the case of such printed or bar code labels, the printed information or its representation can serve as storage of the carbon footprint value.

While generally shown and described herein as a method and system for tracking the carbon footprint value of an object 107, is understood that aspects of the invention further provide various alternative embodiments. For example, in one embodiment, the invention provides a computer program embodied in at least one computer-readable medium, which when executed, enables a computer system to manage carbon data (e.g., including one or more carbon footprint values) of an object. To this extent, the computer-readable medium includes program code, such as carbon tracking program 180 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as carbon tracking program 180 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for tracking the carbon footprint value of an object 107. In this case, a computer system, such as local computing system 110 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A non-transitory computer readable article of manufacture tangibly embodying computer readable instructions for executing a computer implemented method comprising:

associating a tag with an object, wherein the tag is configured to store data and communicate the data using a wireless communications link;

writing a plurality of carbon footprint values to the tag as the object moves through a plurality of stages of a supply chain, wherein each carbon footprint value is related to a weight of at least one greenhouse gas added to the atmosphere as a result of at least a portion of a stage in the supply chain, wherein the plurality of stages of the supply chain comprise at least two of: manufacture, transport, storage, or disposal of the object; and calculating a total carbon footprint value for the object based on the plurality of carbon footprint values written to the tag.

2. A method of generating a system, the method comprising:

associating a tag with an object, wherein the tag is configured to store data and communicate the data using a wireless communications link, and write a plurality of carbon footprint values to the tag as the object moves through a plurality of stages of a supply chain, wherein each carbon footprint value is related to a weight of at least one greenhouse gas added to the atmosphere as a result of at least a portion of a stage in the supply chain, wherein the plurality of stages of the supply chain comprise at least two of: manufacture, transport, storage, or disposal of the object;

providing at least one device configured to transmit a signal associated with the carbon footprint value for processing by the tag using the wireless communications link; and calculating a total carbon footprint value for the object based on the plurality of carbon footprint values written to the tag.

3. The method of claim 2, further comprising providing at least one device configured to read the carbon footprint value from the tag using the wireless communications link.

4. A method comprising:

associating a tag with a first object, wherein the tag is configured to store data and communicate the data using a wireless communications link;

writing a plurality of carbon footprint values to the tag as the first object moves through a plurality of stages of a supply chain, wherein each carbon footprint value is related to a weight of at least one greenhouse gas added to the atmosphere as a result of at least a portion of a stage in the supply chain, wherein the plurality of stages of the supply chain comprise at least two of: manufacture, transport, storage, or disposal of the first object; and calculating a total carbon footprint value for the first object based on the plurality of carbon footprint values written to the tag.

5. The method of claim 4, further comprising reading the carbon footprint value from the tag using a wireless communications device.

6. The method of claim 5, further comprising writing the carbon footprint value to an entry associated with the tag in a database that includes a plurality of entries for a plurality of tags.

7. The method of claim 5, further comprising arranging the first object with respect to at least one additional object related to the first object according to the carbon footprint value read from the tag.

8. The method of claim 5, further comprising presenting the carbon footprint value read from the tag for display to a consumer.

9. The method of claim 4, further comprising:

storing the total carbon footprint value for the first object in at least one of: the tag or an entry associated with the tag in a database stored on a computing device.

10. The method of claim 4, further comprising:

receiving a signal related to the carbon footprint value from a transmitter node associated with a manufacturing stage for the first object; and determining the carbon footprint value based on the signal, wherein the writing is performed in response to the receiving and determining.

11. The method of claim 4, further comprising:

receiving a signal related to the carbon footprint value from a transportation device, wherein the transportation device is included on a vehicle used to transport the first object from a first location to a second location; and determining the carbon footprint value based on the signal, wherein the writing is performed in response to the receiving and determining.

12. The method of claim 4, wherein the associating includes attaching the tag to the first object.

13. A system comprising:

a tag configured to be associated with an object, wherein the tag includes:

a component configured to store data;

a wireless communications device configured to communicate data using a wireless communications link;

a component configured to write a plurality of carbon footprint values to the component configured to store data according to data received by the wireless communications device as the first object moves through a plurality of stages of a supply chain, wherein each carbon footprint value is related to a weight of at least one greenhouse gas added to the atmosphere as a result of at least a portion of a stage in the supply chain, wherein the plurality of stages of the supply chain comprise at least two of: manufacture, transport, storage, or disposal of the object; and a component configured to calculate a total carbon footprint value for the object based on the plurality of carbon footprint values written to the component configured to store data.

14. The system of claim 13, further comprising a second wireless communications device configured to read the carbon footprint value from the tag.

15. The system of claim 13, further comprising:

a component configured to store the total carbon footprint value for the object in at least one of: the component configured to store data in the tag or an entry associated with the tag in a database stored on a computing device.

16. The system of claim 13, further comprising a device configured to transmit a signal related to the carbon footprint value for an associated manufacturing stage for the object, wherein the tag further includes a component configured to determine the carbon footprint value based on the signal.

17. The system of claim 13, further comprising a device configured to transmit a signal related to the carbon footprint value, wherein the transportation device is included on a vehicle used to transport the object from a first location to a second location, and wherein the carbon footprint value is related to a weight of at least one greenhouse gas added to the atmosphere as a result of at least a portion of the transport of the object, and wherein the tag further includes a component configured to determine the carbon footprint value based on the signal.

18. The system of claim 13, wherein the tag is physically attached to the object.

19. The system of claim 14, further comprising:

a component configured to manage a database that includes a plurality of entries for a plurality of tags; and a component configured to write the carbon footprint value to an entry associated with the tag in the database.

20. The system of claim 14, further comprising a device configured to present the carbon footprint value read from the tag for display to a consumer.

* * * * *